…

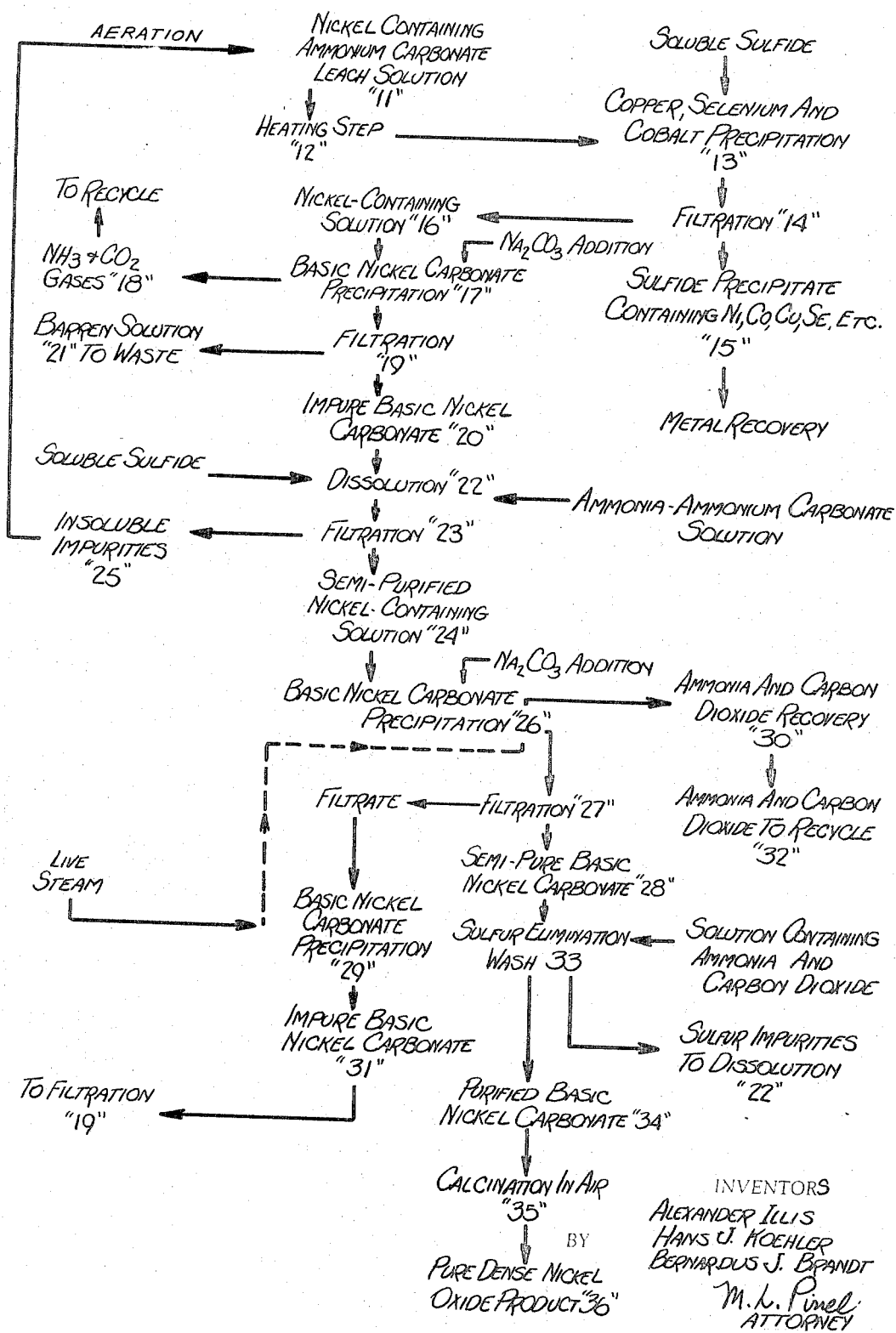

United States Patent Office 3,342,547
Patented Sept. 19, 1967

3,342,547
METHOD FOR THE PRODUCTION OF HIGH PURITY DENSE NICKEL OXIDE AND THE PRODUCT THEREOF
Alexander Illis, Copper Cliff, Ontario, Hans Joachim Koehler, Lively, Ontario, and Bernardus J. Brandt, Thompson, Manitoba, Canada, assignors to The International Nickel Company, Inc., New York, N.Y., a Corporation of Delaware
Filed July 13, 1964, Ser. No. 382,208
Claims priority, application Canada, June 10, 1964, 904,820
23 Claims. (Cl. 23—61)

The present invention relates to a process for treating nickel-containing ammonia leach solutions for the recovery of a pure nickel compound therefrom, and, more particularly, to a process for recovering nickel in the form of very pure basic nickel carbonate from nickel-containing ammoniacal leach solutions.

Processes involving the leaching of nickeliferous sulfide and oxide ores and concentrates using ammoniacal ammonium carbonate solutions for the extraction of the nickel values therefrom and subsequent treatment of the resulting leach solutions to recover the extracted nickel are well known in the metallurgical art. Thus, in the process of U.S. Patent No. 2,400,098 nickeliferous lateritic ores are first reduced and then treated with an ammonium carbonate solution containing ammonia as ammonium hydroxide to extract nickel and cobalt therefrom. The patent then describes distilling off ammonia to precipitate nickel and cobalt compounds which are then converted to oxides by calcining. Again, in Canadian Patent No. 530,842 a process is described in which nickeliferous sulfide concentrates are roasted to a low-sulfur calcine and the calcine is then subjected to a special selective reducing operation followed by leaching of the reduced calcine with ammoniacal solutions containing ammonia and carbon dioxide to dissolve the nickel contained therein. The leach solution is then heated to form and recover basic nickel carbonate.

Although these processes have been successfully utilized for removing nickel from nickeliferous sulfide and oxide ores and concentrates, the nickel products obtained thereby are seriously contaminated by impurities such as copper, cobalt, magnesium, iron, sodium, silicon, lead, sulfur, selenium, etc., and to meet trade requirements it is necessary to eliminate these impurities. Many attempts have been made to overcome the diffculties involved in purifying the nickel products from these leach solutions since it would be a highly desirable objective to treat such materials so as to provide therefrom a single grade of nickel oxide suitable for the chemical, metallurgical, ceramic and electronic industries and which would have high purity, ready solubility in dilute acids and yet would have relatively high density for shipping and handling purposes. So far as we are aware, none of these attempts has been entirely successful when carried into practice commercially on an industrial scale.

It has now been discovered that nickel-containing, ammoniacal leach solutions obtained from the leaching of nickeliferous sulfide and oxide ores and concentrates may be treated by a special purification procedure involving the precipitation of basic nickel carbonate to recover a very pure basic nickel carbonate salt therefrom which may be calcined to form a very pure and dense nickel oxide.

It is an object of the present invention to provide a process for treating nickel-containing ammonium carbonate leach solutions for recovery of pure basic nickel carbonate therefrom.

Another object of the invention is to provide a special purification procedure for treating leach solutions obtained from the ammonia-carbon dioxide leaching of nickel ores and concentrates for the recovery of a nickel product therefrom which is substantially devoid of impurities.

The invention also contemplates providing a novel process for removing nickel from ammoniacal ammonium carbonate leach solutions as a pure basic nickel carbonate which can be treated for recovery of a very pure, dense and highly active nickel oxide therefrom.

It is a further object of the invention to provide a novel technique for recovering nickel as a very pure nickel oxide from difficult-to-treat ammonia leach solutions containing nickel which are contaminated with substantial amounts of impurities.

The invention further contemplates providing a novel means for treating basic nickel carbonate precipitates obtained from nickel-containing ammonia leach solutions for the substantially complete removal of contaminating impurities therefrom.

It is another object of the invention to provide a novel process for treating ammoniacal ammonium carbonate leach solutions for recovery of a high grade nickel oxide substantially free from impurities.

It is a further object of the invention to provide highly pure, dense black nickel oxide having high chemical activity including high solubility in weak acids.

Other objects and advantages will become apparent from the following description taken in conjunction with the accompanying drawing which illustrates in a block flow diagram a series of operations embodying the present invention for producing active nickel oxide of high purity from nickel-containing ammonia leach solutions.

Generally speaking, the present invention provides a method for producing dense black nickel oxide of high activity, including high acid solubility, and very high purity from a crude nickel carbonate by a method comprising dissolving a crude nickel carbonate in an ammonia-carbon dioxide leach solution containing a soluble sulfide to inhibit solution of impurities such as copper, cobalt, selenium, etc., present therein, separating insoluble residue and heating the resultant solution at a temperature between about 200° F. and 250° F., advantageously by steam distillation, to remove ammonia and carbon dioxide therefrom and to cause precipitation of at least about 70% of the nickel present therein at a controlled precipitation rate of about 0.2 gram to about 2 grams per liter of nickel per minute, removing the nickel carbonate precipitate from the supernatant solution, washing the precipitate to remove sulfur remaining therein and calcining the washed precipitate in the presence of excess oxygen, e.g., in air, at a temperature between about 500° F. and 1600° F. to yield a dense, active, nickel oxide which is black to grayish in color.

The present invention is particularly advantageous for working up pregnant solutions obtained from the leaching of nickeliferous sulfide and oxide materials using ammonium carbonate solutions. These crude pregnant ammonia leach solutions contain up to about 25 grams per liter of nickel and varying amounts of contaminating elements such as copper, cobalt, iron, sulfur, selenium, magnesium, sodium, silicon, etc. When such solutions contain nickel and copper in a ratio not exceeding about 500:1 the solutions are first subjected to an initial sulfide precipitation for the purpose of removing from the solution a major amount of the copper and a substantial amount of any selenium and cobalt present therein. The present invention is based in part upon the discovery that pregnant ammonia leach solutions obtained by leaching nickeliferous materials containing small amounts of copper and sulfur, contain sulfur in the form of trithionate $(S_3O_6)^=$ ions. Accordingly, as a preliminary step to sulfide precipitation the pregnant solution is first heated to hydrolyze trithionate ions in the solution. A heating time of about 1 hour to about 5 hours at a temperature of about 140° F. to 170° F., e.g., 2 hours at 160° F., is sufficient to effect the hydrolysis of almost all of the trithionate ion. When this hydrolysis is completed, a controlled amount of soluble sulfide is added to the solution and the resultant precipitate containing some nickel, i.e., not more than 10% and more advantageously not more than 5% of the nickel, most of the copper and a substantial amount of any selenium and cobalt present is separated from the solution. The supernatant solution is then heated, advantageously by steam distillation, to vaporize ammonia and carbon dioxide present therein and to precipitate substantially all of the nickel as a crude basic nickel carbonate.

The trithionate ion hydrolysis affords a substantial saving in sulfide precipitant in the sulfide precipitation step. This saving can amount to 20% to 30% of that required for the initial precipitation step in the treatment of crude ammonia leach solutions containing nickel and copper in a ratio not exceeding 500:1, e.g., 100:1. It will be appreciated that when the nickel-copper ratio in the initial pregnant ammonia leach solution exceeds 500:1, e.g., 1000:1, the initial sulfide precipitation is usually not required.

It will be appreciated that the initial sulfide precipitation must be carefully conducted in order to avoid precipitation of large amounts of nickel along with the other impurities which are precipitated by means of the sulfide reactant. An advantageous control for the sulfide precipitation comprises continuous redox potential measurement of the solution. Thus, the redox potential is advantageously controlled in the range of about minus 250 to minus 360 millivolts (mv.) as measured by a platinum electrode versus the saturated calomel electrode (S.C.E.) in order to provide precipitation of nearly all of the copper but nevertheless to assure that a high ratio of copper to nickel in the sulfide precipitate will be obtained, e.g., a ratio of about 1:1 or higher. Redox potentials more highly negative than minus 360 mv. (platinum electrode vs. S.C.E.) act to co-precipitate undesirably large amounts of nickel.

The crude basic nickel carbonate precipitate obtained by precipitation from the supernatant solution after the initial sulfide precipitation or from some other source is dissolved in an ammonia-carbon dioxide solution containing between 50 and 150 grams per liter of ammonia and between 25 and 75 grams per liter of carbon dioxide. The concentrations of ammonia and carbon dioxide in the dissolving solution are maintained within the foregoing ranges to provide nickel-containing solutions having a sufficient concentration of nickel to be economically handled while avoiding excessively high nickel concentrations which would result in undesirable viscosity increases with attendant problems in handling. Dissolution of impurities such as iron and magnesium in the nickel carbonate being dissolved is minimized by maintaining the carbon dioxide content of the dissolving solution in the lower part of the range, e.g., 40 grams per liter or less. A controlled amount of a soluble sulfide is incorporated in the ammonia-carbon dioxide dissolving solution in order to inhibit solution of copper and other impurities still remaining in the crude nickel carbonate precipitate to be dissolved. The dissolution operation generates heat and, accordingly, heating of the solution during the dissolution operation is not required. In the dissolution operation not more than 3% of sulfur as a soluble sulfide, e.g., sodium hydrogen sulfide (NaHS), sodium sulfide, hydrogen sulfide, etc., by weight of the nickel content in the crude nickel carbonate is employed in the dissolving solution. In this connection, it can be pointed out that each pound of NaHS added will precipitate approximately one pound of nickel and it is necessary from an economic standpoint to minimize undue loss of nickel while maximizing the ability of the sulfide precipitant to inhibit the redissolution of unwanted impurities such as copper, cobalt, selenium, etc., still contained in the crude nickel carbonate. The operation advantageously is controlled by continuously maintaining the redox potential of the solution between about minus 450 to about minus 475 mv. (platinum electrode vs. S.C.E.) and by continuously measuring the nickel content in solution.

The nickel-containing solution resulting from the redissolution operation is substantially purified as compared to the initial crude nickel-containing material, e.g., a crude pregnant ammonia leach solution, fed to the process. This resultant nickel-containing solution which contains at least about 10 grams per liter and usually about 20 to about 60 grams per liter of nickel is again heated, advantageously by steam distillation, to precipitate the nickel content thereof in the form of a basic nickel carbonate. This precipitation operation effects vaporization of ammonia and carbon dioxide from the solution and is conducted under carefully controlled conditions of temperature and rate of nickel precipitation to precipitate at least 70% of the nickel in the solution and, generally, to leave not less than 1 gram per liter of nickel in solution. In this manner, a basic nickel carbonate is obtained which is readily filtered and which can be calcined in air to yield a nickel oxide having a desired physical structure as contemplated in accordance with the invention. Advantageously, between 85% and 95% of the nickel is precipitated. As an advantageous process control, from about 1 to about 10 grams per liter of nickel is left in solution. It should be appreciated that when less than 70% of the nickel is precipitated, the basic nickel carbonate product has an extremely fine particle size, settles poorly, and is difficult to filter. It is uneconomic to precipitate less than about 70% of the nickel, and, in addition, the physical structure of such a carbonate is detrimental to the production of nickel oxide with advantageous physical properties. When over about 99% of the nickel is precipitated another undesirable structural change in the nickel carbonate frequently occurs particularly when the precipitation temperature exceeds about 200° F. and/or the precipitation rate is high. In this case, the resulting basic nickel carbonate contains less than about 7% carbon dioxide and the physical properties of nickel oxide produced by calcination thereof are adversely affected. The precipitation is best carried out at a temperature between about 170° F. and 250° F. when distillation is conducted at pressures from about atmospheric up to about 50 pounds per square inch gage. A practical advantageous range of distillation temperatures is about 200° F. to about 250° F. At temperatures of below about 170° F. the precipitation is quite slow and the physical structure of the basic nickel carbonate is similar to that of a carbonate produced by precipitating less than 70% of the nickel in solution. At precipitation temperatures above about 250° F. removal of carbon dioxide is too rapid and a precipitate containing less than 7% carbon dioxide and having a physical structure similar to nickel carbonate produced by precipitating over about 99% of the nickel in solution is formed. As noted above, such nickel carbonates yield nickel oxide products with undesirable physical properties. Vacuum distillation can be conducted at lower temperatures, but practical operating difficulties are then encountered. The rate of precipitation of nickel is a desirable process control in producing purified nickel carbonate which can be calcined to yield nickel oxide having advantageous physical properties, including high density. This rate of precipitation should be about 0.2 to about 2 grams of nickel per liter per minute, e.g., about 0.5 gram to about 1 gram of nickel per liter per minute. The lower rates of precipitation and the lower temperatures within the foregoing ranges favor the formation of nickel carbonate high in carbon dioxide and containing a minimum amount of water of crystallization, which can be calcined in air to yield a dense, black nickel oxide product.

The basic nickel carbonate precipitate after being filtered off is washed with a solution containing both ammonia and carbon dioxide to remove sulfur impurities therefrom and to provide a highly purified basic nickel carbonate. For maximum sulfur removal, the wash solution contains about 10 to 20 grams per liter of ammonia and about 25 to 50 grams per liter of carbon dioxide. It is found that when the concentrations of ammonia and carbon dioxide are lower than the aforementioned amounts, insufficient removal of sulfur is obtained but that when the concentration of the reagents in the solution is higher, undesirable solution of nickel occurs. Advantageously, the composition of the wash solution should approach that of an ammonium bicarbonate solution. A very effective wash solution contains about 10 grams per liter of ammonia and about 25 grams per liter of carbon dioxide. It is advantageous to wash the resulting washed filter cake with sulfur-free water. Other means than the ammonium carbonate wash may be employed to reduce the sulfur content of the calcined product. For example, a small amount of a sulfur-fixing compound such as about 2% of soda ash can be mixed with the nickel carbonate before calcination and the resulting oxide can be water washed to remove soluble sodium salts.

The purified basic nickel carbonate is calcined in air at a temperature of about 500° F. to about 1600° F. and more advantageously at a temperature between about 600° F. and 1200° F. to drive off carbon dioxide and water, to form a dense, acid soluble, finely-divided, nickel oxide containing less than about 0.5% of impurities which is suitable for many requirements in the trade. This nickel oxide has a packed bulk density of at least about 75, and more usually, about 90 or 100 and up to about 200 pounds per cubic foot. This nickel oxide as determined by two independent analytical methods contains up to about 5 atomic percent of oxygen in excess of the stoichiometric amount represented by the formula NiO. It is found that the calcination temperature advantageously should be at least 600° F. and for most purposes and particularly for purposes of high acid solubility it should not exceed 1200° F. The calcination temperature can be higher, even as high as 2000° F., although the activity of the resulting product as reflected by acid solubility is detrimentally affected. It is also found that the desired highly soluble product is black to blackish-grey in color. Products calcined for long periods of time, e.g., longer than 2 hours, or products calcined at higher temperatures, e.g., 1600° F. or higher, or products calcined in atmospheres deficient in oxygen, e.g., a nitrogen atmosphere, are deficient in excess oxygen and have decreased activity. To obtain a product with maximum activity, the calcination time in the advantageous calcination temperature range should be as short as possible and ideally should not exceed the time required to completely decompose the nickel carbonate. This deficiency in excess oxygen content is also shown by a color change in the product in that the black color changes from black through various shades of grey to a green product. The dense oxide product of the invention has a fine particle size, e.g., a particle size range such that 30% of the particles are less than 10 microns, 60% are less than 15 microns, 90% are less than 25 microns and 98% are less than 30 microns. Thus, the oxide product will pass a 325 mesh screen almost entirely.

The following table shows the effect of calcination temperature on the activity of the nickel oxide contemplated in accordance with the invention as reflected by the solubility thereof in a relatively dilute solution of sulfuric acid. A weighed amount of the oxide produced by calcining nickel carbonate in air for 2 hours at different temperatures was treated with an aqueous solution containing 60 g.p.l. of sulfuric acid and containing 10% in excess of the theoretical requirement for complete dissolution of the nickel. The slurry was heated in a flask for two hours at the boiling point of the solution, while the volume of solution was kept constant by the use of a reflux condenser attached to the flask.

TABLE I

| Calcination Temp., ° F. | Excess Oxygen Content, Atomic Percent | | Color | Ni Dissolved, Percent |
|---|---|---|---|---|
| | H₂ Reduction Method | KI Method [1] | | |
| 600 | 5 | 4.3 | Very Black | 100 |
| 800 | 2 | 1.9 | Black | 100 |
| 1,000 | <1 | 0.50 | Greyish-Black | 100 |
| 1,200 | <1 | 0.26 | Blackish-Grey | 99.9 |
| 1,400 | <1 | 0.16 | Grey | 99.4 |
| 1,600 | <1 | 0.08 | Greenish-Grey | 91.3 |
| 1,800 | <1 | 0.04 | Greyish-Green | 70.0 |
| 2,000 | <1 | 0.015 | Green | 4.8 |

[1] Method for Determining Available Oxygen Standard Methods of Chemical Analysis. W. W. Scott, D. Van Nostrand Co., N.Y., 5th edition, page 675. Procedure B.

The superior activity of the new oxide is the result of a low-temperature calcination in the presence of excess oxygen, such as supplied by air or oxygen, which treatment introduces a slight excess of oxygen, i.e., at least about 0.1 atomic percent up to about 5 atomic percent of oxygen, over the stoichiometric requirement necessary to produce NiO. More advantageously, the excess oxygen content of the special oxide product is at least 1 atomic percent or even at least 2 atomic percent as such advantageous materials have substantially improved activity as indicated, for example, by discriminating tests for solubility and are black in color.

The effects of precipitation temperature, rate of precipitation and percentage of nickel precipitated, as well as the relationship between the carbon dioxide content of the basic nickel carbonate produced and the bulk density of the nickel oxide produced therefrom can be seen from the following table. The nickel-containing pregnant solution was the same for all tests and analyzed 30 g.p.l. of nickel.

TABLE II

| Average Distillation Temp., °F. | Average Rate of Nickel Precipitation, g./l./min. | Amount of Nickel Precipitation, percent | Carbon Dioxide Content of Nickel Product, percent | Packed[1] Bulk Density of Nickel Oxide, lb./ft.$^3$ |
|---|---|---|---|---|
| 170 | 0.3 | 90 | 17 | 137 |
| 170 | 0.3 | 99 | 16 | 125 |
| 170 | 0.3 | >99 | 14 | 120 |
| 170 | 1.1 | 90 | 17 | 123 |
| 170 | 1.1 | 99 | 16 | 110 |
| 170 | 1.1 | >99 | 13 | 105 |
| 200 | 0.2 | 90 | 14 | 162 |
| 200 | 0.2 | 99 | 13 | 140 |
| 200 | 0.2 | >99 | 9 | 120 |
| 200 | 1.8 | 90 | 15 | 102 |
| 200 | 1.8 | 99 | 14 | 80 |
| 200 | 1.8 | >99 | 5 | 40 |
| 230 | 0.3 | 90 | 14 | 155 |
| 230 | 0.3 | 99 | 14 | 111 |
| 230 | 0.3 | >99 | 4 | 65 |
| 230 | 1.5 | 90 | 15 | 107 |
| 230 | 1.5 | 99 | 14 | 90 |
| 230 | 1.5 | >99 | 6 | 59 |
| 250 | 0.2 | 90 | 14 | 115 |
| 250 | 0.2 | 99 | 13 | 85 |
| 250 | 0.2 | >99 | 5 | 36 |
| 250 | 1.8 | 90 | 14 | 102 |
| 250 | 1.8 | 99 | 12 | 74 |
| 250 | 1.8 | >99 | 5 | 35 |

[1] The term "packed bulk density" refers to the ratio of the weight of nickel oxide and the minimum volume that this amount will occupy when a cylindrical vessel containing the oxide is tapped until there is no further decrease in oxide volume. The height of the oxide column should be at least six times its diameter. The ratio of weight to volume (hereafter referred to as "bulk density") is usually expressed in pounds per cubic foot.

It is to noted that, generally speaking, a low-temperature distillation, within the temperature range of e.g., 200° F. to 250° F., at a slow rate permits the precipitation of a high proportion of the nickel in the form of a product with a carbon dioxide content higher than about 7%, which, when calcined, produces an oxide with high bulk density.

The superior activity of the black nickel oxide in accordance with the invention is quite evident from the following table which compares the solubility of the novel nickel oxide (Oxide No. 1) in various dilute mineral acids and organic acids with other nickel oxides of the prior art.

It is to be noted that the highly purified black nickel oxide (Oxide 1) was produced by a novel two-stage purification procedure. So far as we are aware this nickel oxide meets the specifications of all nickel consuming industries. However, if necessary to decrease the level of impurities in the nickel oxide still further, e.g., to a level below about 0.1% impurities, a third-stage purification step, involving a similar technique as employed in the second stage redissolving step, may be carried out. On the other hand, a single stage purification step (eliminating the first stage sulfide precipitation operation) may be sufficient to produce a highly purified nickel oxide from those nickel-containing leach solutions that are already relatively low in copper, selenium and other impurities.

TABLE III

[Solubility of Black Oxide in Dilute Acids for 3 Hours at 212° F. at 110% of Stoichiometric Requirement for Nickel, Percent]

| Oxide No. | Sulfamic Acid $NH_2SO_3H$ | Sulfuric Acid $H_2SO_4$ | Hydrochloric Acid HCl | Nitric Acid $HNO_3$ | Acetic Acid $CH_3COOH$ | Formic Acid HCOOH | Tri-chlor Acetic Acid $CCl_3COOH$ |
|---|---|---|---|---|---|---|---|
| 1 | 100 | 100 | 100 | 100 | 98 | 99 | 100 |
| 2 | 5.6 | 88 | 42 | 44 | 0.4 | 7.2 | 11 |
| 3 | 2.8 | 2.8 | 21 | 5.2 | 0.2 | 0.3 | 0.5 |
| 4 | 1.7 | 1.7 | 11 | 2.8 | 0.1 | 1.8 | 0.4 |

The superior quality of Oxide 1 is further shown by its chemical analysis. Table IV shows the comparative chemical compositions of Oxides 1 to 4.

TABLE IV
[Chemical Analysis, Percent]

| | Oxide 1 | Oxide 2 | Oxide 3 | Oxide 4 |
|---|---|---|---|---|
| Uses | ch, m, c, e | c, m | c | c, m |
| Ni | 76.2 | 76.8 | 76.6 | 76.4 |
| Co | 0.05 | 0.56 | 0.46 | 0.60 |
| S | 0.05 | 0.007 | 0.14 | 0.007 |
| Mg | 0.04 | 0.03 | 0.02 | 0.61 |
| Na | 0.01 | 0.35 | 0.07 | 0.01 |
| Si | 0.02 | 0.04 | 0.28 | 0.15 |
| Fe | 0.007 | 0.20 | 0.25 | 0.37 |
| Se | 0.005 | <0.001 | <0.001 | <0.001 |
| Ca | 0.006 | 0.11 | 0.09 | 0.09 |
| Al | 0.001 | 0.14 | 0.11 | 0.01 |
| Cu | 0.001 | 0.129 | 0.056 | 0.009 |
| Pb | <0.0001 | <0.0001 | 0.0024 | 0.0002 |

NOTE.—ch=chemical; m=metallurgical; c=ceramic; e=electronic.

The following table shows the effect of different atmospheres during the calcination of nickel carbonate at 800° F. for ½ hour, on the rate of dissolution of the nickel oxide product in dilute sulfuric acid at pH 2 and at 180° F.

TABLE V

| Calcination Atmosphere | Amount of Nickel Oxide Dissolved, Percent | Dissolution Time, Min. | Excess Oxygen Content of Nickel Oxide, Atomic Percent |
|---|---|---|---|
| Nitrogen | 50 | 8 | Nil |
| | 75 | 15 | |
| | 100 | 60 | |
| Air | 50 | 3 | 2 |
| | 75 | 5 | |
| | 100 | 6 | |
| Oxygen | 50 | 2 | 3 |
| | 75 | 4 | |
| | 100 | 5 | |

The above table shows the importance of calcining in an oxygen or oxygen containing atmosphere to produce a rapidly dissolving nickel oxide and also shows that the rate of dissolution increases with increasing excess oxygen contents.

The principles of the invention will be described with reference to the accompanying drawing which illustrates a series of operations embodying the overall process. A nickel-containing ammoniacal ammonium carbonate pregnant solution 11 from leaching operations and containing copper, cobalt and selenium as principal impurities, is first heated in step 12 at between 140° F. and 170° F. to hydrolyze trithionate sulfur present therein. This operation eliminates excessive consumption of sulfide precipitating reagent in subsequent purification steps due to reaction between trithionate sulfur and the soluble sulfide precipitant. After hydrolyzing the trithionate sulfur, the solution is treated in copper, selenium and cobalt precipitation step 13 in which an amount of soluble sulfide controlled by redox potential is added to the solution to precipitate therefrom substantially all of the copper and a part of the selenium and the cobalt as sulfides while precipitating less than about 5% of the nickel contained therein. In filtration operation 14, the copper-nickel-cobalt-selenium-sulfur precipitate 15 formed in step 13 is filtered off leaving a partially purified nickel-containing solution 16 which is still relatively high in copper, selenium and cobalt. The precipitate of copper and selenium sulfides 15, containing some nickel, can be treated further for recovery of metal values. Solution 16 from the filtration operation 14 is then treated with sodium carbonate equivalent to its sulfur content and heated with live steam in precipitation operation 17 to substantially completely precipitate an impure basic nickel carbonate while vaporizing ammonia and carbon dioxide gases 18 which are recycled to the leaching stages. In filtration operation 19 the impure basic nickel carbonate 20 is filtered off leaving barren solution 21 which is discarded to waste.

This impure basic nickel carbonate 20 is, if desired, partially dried to lower its water content and is dissolved in an ammoniacal ammonium carbonate solution in step 22 in the presence of a soluble sulfide which acts to prevent the redissolution of substantially all of the residual copper, selenium, cobalt and other impurities contained in the impure carbonate. In filtration step 23 the insoluble impurities 25 remaining from dissolution step 22 are filtered off, leaving a purified nickel-containing solution. The residue of impurities 25 which contains sulfur, iron, silica and magnesia as well as copper, selenium and cobalt and which also contains nickel is recycled to the crude pregnant solution 11 where the nickel and selenium contained in the impurities residue are redissolved by aeration prior to heating step 12 and copper, selenium and cobalt precipitation step 13.

Solution 24 is now treated with sodium carbonate equivalent to its sulfur content and heated in step 26 at between 200° F. to 250° F. to volatilize and recover for reuse most of the contained ammonia and carbon dioxide and to precipitate most of the nickel, leaving not less than 1 g.p.l. of nickel in solution to form a semi-pure basic nickel carbonate analyzing over 7% carbon dioxide. This operation advantageously is carried out in a series of kettles countercurrent to live steam. In filtration step 27 this basic nickel carbonate precipitate 28 is filtered off, leaving a filtrate containing small amounts of nickel as well as ammonia and carbon dioxide. The filtrate is heated in step 29 to precipitate the residual nickel and to vaporize ammonia and carbon dioxide 30 which is recycled, 32, to leaching operations. The nickel residue 31 obtained from operation 29 is mixed with the impure nickel carbonate from the first stage and redissolved in step 22.

The semi-pure basic nickel carbonate 28 is washed in step 33 with a solution containing ammonia and carbon dioxide to remove sulfur therefrom, the wash solution is recycled to operation 22 and the purified basic nickel carbonate 34 remaining, substantially devoid of sulfur, is then calcined in air in step 35 at between 500° F. and 1600° F. and advantageously between 600° F. and 1200° F. to drive off carbon dioxide and form an acid-soluble and dense nickel oxide 36 with a very low impurities level.

For the purpose of giving those skilled in the art a better understanding of the invention and a better appreciation of the advantages of the invention the following illustrative examples are given:

EXAMPLE I

An ammoniacal ammonium carbonate, crude, pregnant solution obtained from the leaching of an oxidized and reduced nickel-containing iron sulfide concentrate, and containing 50 grams per liter of ammonia, 25 grams per liter of carbon dioxide, 5 grams per liter of nickel and 0.3, 0.3, 0.01, 3 and 0.05 gram per liter of copper, cobalt, iron, sulfur and selenium, respectively, was heated at 170° F. for one hour to hydrolize trithionate sulfur contained therein. Sodium hydrosulfide was then added to the solution at the rate of 0.10 pound per pound of nickel in the solution being treated. This addition of sulfide was controlled by continuously maintaining the redox potential at minus 350 mv. (platinum electrode vs. S.C.E.). A copper- and selenium-containing sulfide precipitate analyzing 15% copper, 15% nickel, 1.5% selenium, 5% cobalt and 15% sulfur (representing 95% of the copper, 30% of the cobalt and 50% of the selenium content of the pregnant solution) was formed. This precipitate was filtered off and was treated separately for recovery of metals contained therein. The partly-purified pregnant solution was heated with steam at about 250° F. in a series of kettles to vaporize ammonia and carbon dioxide, which were recycled to the leaching circuits, and to completely precipitate the nickel as an impure basic nickel carbonate. The carbonate was filtered off and the barren solution remaining was discarded. The impure basic nickel carbonate was then dissolved in ammoniacal ammonium carbonate solution containing 100 grams per liter of ammonia and 50 grams per liter of carbon dioxide and 0.05 pound of sodium hydrosulfide per pound of nickel being dissolved. This amount of sulfide present was controlled by continuously maintaining the redox potential between minus 450 and minus 475 mv. (platinum electrode vs. S.C.E.) and by continuously measuring the nickel concentration in solution. In this operation a residue containing substantially all the residual copper and selenium as well as cobalt, sulfur, iron, silica, magnesia and some nickel remained undissolved. This residue was filtered off and returned to the crude pregnant solution in which nickel and selenium in the residue were dissolved by aeration prior to first sulfide addition. The undissolved impurities, containing silica, magnesia, iron and small amounts of nickel, copper and cobalt, were filtered off after aeration. The purified nickel-containing ammoniacal ammonium carbonate solution, after removal of the residue, analyzed 40 grams per liter of nickel and was heated with steam at 240° F. to precipitate only 95% of the nickel in a basic nickel carbonate analyzing 15% carbon dioxide at a precipitation rate of about 1 gram of nickel per liter per minute. This carbonate was filtered off and was washed with a solution containing 10 grams per liter of ammonia and 25 grams per liter of carbon dioxide to remove sulfur therefrom. The filtrate remaining and wash solution were then heated with steam to vaporize and recover ammonia and carbon dioxide, which were recycled to the leaching circuits, and to precipitate the remaining nickel which was recycled to the precipitate containing the impure basic nickel carbonate from the first stage. The purified basic nickel carbonate was then calcined in air at 850° F. to an acid soluble, dense black nickel oxide analyzing 76.2% nickel, 0.05% cobalt, 0.05% sulfur, 0.04% magnesium, 0.03% silicon, 0.01% sodium, 0.005% iron, 0.005% selenium and 0.001% copper and having a packed bulk density of 150 pounds per cubic foot.

To illustrate the greatly improved results and superior product obtained by the present invention, a pregnant solution similar in composition to that treated in Example I was treated by a prior art technique to recover the nickel therefrom in the following manner:

A crude nickel-containing ammoniacal ammonium carbonate, pregnant solution was treated with sodium hydrosulfide added at a rate of 0.3 pound per pound of nickel in solution to produce a sulfide precipitate analyzing 5% copper, 25% nickel, 0.5% selenium and 15% sulfur. This represented more than 99% of both the copper and the selenium content of the pregnant solution. The precipitate was filtered off and treated separately for recovery of metal values. The purified pregnant solution was heated with steam at about 250° F. in a series of kettles to vaporize ammonia and carbon dioxide, which were recycled to the leaching circuits, to completely precipitate the nickel as a semi-purified basic nickel carbonate. The basic nickel carbonate so obtained was calcined at 850° F. to form a nickel oxide product analyzing 76% nickel, 0.01% copper, 0.3% cobalt, 0.20% iron, 2% sulfur and 0.05% selenium. This nickel oxide product had a packed bulk density of only 30 pounds per cubic foot. As can be seen by comparing the foregoing analysis with the analysis of the product of Example I this product was very much inferior to that of the present invention, being completely unsuitable for the chemical and electronic industries. At the same time, its shipping characteristics are very unfavorable compared with those of the present novel nickel oxide product. It is to be noted also that the total soluble sulfide consumption for production of this nickel oxide of the prior art (0.3 pound per pound of nickel) is twice that employed in producing the nickel oxide of the present invention and that in order to eliminate selenium from the pregnant solution in this process of the prior art by use of soluble sulfide reagent it is necessary to precipitate a much greater amount of nickel as sulfide than by the hereindescribed novel process. Thus, the process of the prior art resulted in a precipitate containing 25% nickel and 0.5% selenium in order to separate selenium whereas initial selenium separation was accomplished by the present novel process in a precipitate containing 15% nickel and 1.5 selenium. Thus, in this particular instance five times as much nickel was precipitated as sulfide in order to eliminate selenium by this prior art procedure as is precipitated by the hereindescribed process for the same purpose.

Table VI shows a comparison of results obtained by Example I for the present invention and by the prior art technique. As can be seen by the table, the novel procedure of the present process is completely superior to the conventional procedure of the prior art, not only in purity and utility of product obtained but also in economy of reagent consumption and physical make-up of the product. As outlined above, the composition of the pregnant solutions treated by the two techniques is similar. It is to be noted that the cobalt and selenium concentrations in solution are at a somewhat higher level in the pregnant solution treated by the novel procedure, due to the fact that the second stage copper-selenium-sulfur precipitate is dissolved therein prior to the first sulfide precipitation step.

TABLE VI

| Process Used | Product Analyzed | Chemical Analysis | | | | | | Bulk Density NiO, lb./ft.$^3$ | NaHS Consumption, lb./lb. Ni |
|---|---|---|---|---|---|---|---|---|---|
| | | Ni | Cu | Co | Fe | S | Se | | |
| Present Invention | Pregnant Solution, g.p.l. | 5 | 0.3 | 0.3 | 0.01 | 3 | 0.05 | | 0.15 |
| | First Cu-Se-S Precipitate, Percent | 15 | 15 | 5 | 0.5 | 15 | 1.5 | | |
| | Ni Oxide Product, Percent | 76 | 0.001 | 0.05 | 0.01 | 0.05 | 0.005 | 150 | |
| Prior Art | Pregnant Solution, g.p.l. | 5 | 0.3 | 0.1 | 0.01 | 3 | 0.03 | | 0.3 |
| | Cu-Se-S Precipitate, Percent | 25 | 5 | 1.3 | 0.1 | 15 | 0.5 | | |
| | Ni Oxide Product, Percent | 76 | 0.01 | 0.3 | 0.2 | 2 | 0.005 | 30 | |

NOTE.—lb./lb. Ni=pounds per pound of nickel; lb./ft.$^3$=pounds per cubic foot.

EXAMPLE II

An ammoniacal ammonium carbonate, crude, pregnant solution obtained from the leaching of selectively reduced nickel-containing oxide ore, and containing 5 grams per liter of nickel and 0.002 and 0.006 gram per liter of copper and cobalt, respectively, was heated with steam at about 250° F. in a series of kettles to completely precipitate the nickel as an impure basic nickel carbonate. The vaporized ammonia and carbon dioxide were recycled to the leaching circuits. The nickel carbonate was filtered off and the barren solution remaining was discarded. The impure basic nickel carbonate analyzed as follows:

TABLE VII

| Percent Ni | Percent Cu | Percent Co | Percent Mg | Percent Ca | Percent Al | Percent Si | Percent Fe | Percent S | Percent CO$_2$ |
|---|---|---|---|---|---|---|---|---|---|
| 45.0 | 0.023 | 0.065 | 0.21 | 0.06 | 0.01 | 0.15 | 0.21 | 1.20 | 8.0 |

The carbonate was then dissolved in an ammoniacal ammonium carbonate solution containing 120 g.p.l. of ammonia, 40 g.p.l. of carbon dioxide, and 0.05 pound of sodum hydrosulfide per pound of nickel being dissolved. This amount of sulfide present was controlled by continuous measurements of redox potential and nickel concentration in solution.

In this operation a residue containing substantially all the copper, cobalt, alumina, silica, iron, sulfur and 5% of the nickel remained undissolved. This residue was filtered off and treated separately to recover the contained metals therein. The remaining purified nickel-containing ammoniacal ammonium carbonate solution was heated with steam at 240° F. to precipitate 95% of the nickel in solution as a basic nickel carbonate analyzing 14.6% carbon dioxide. This carbonate was filtered off and was washed with a solution analyzing 10 g.p.l. of ammonia and 25 g.p.l. of carbon dioxide to remove sulfur therefrom. The filtrate remaining and wash solution were then heated with steam to vaporize and recover ammonia and carbon dioxide, which was recycled to the leaching circuits, and to precipitate the remaining 5% of the nickel which was recycled and mixed in with the impure basic nickel carbonate from the first stage.

The purified basic nickel carbonate was then calcined at 850° F. in air to an acid soluble, dense, black nickel oxide analyzing 76.5% Ni, <0.001% Cu, 0.015% Co, 0.14% Mg, 0.06% Ca, <0.002% Al, 0.03% Si, 0.01% Fe, 0.046% S and having a packed bulk density of 110 pounds per cubic foot. In order to compare the purity and bulk density of this product with those of prior art nickel oxide, the impure first stage nickel carbonate from the above described treatment was calcined in air at 850° F. This impure nickel oxide analyzed: 69.6% Ni, 0.35%

Cu, 0.102% Co, 0.32% Mg, 0.10% Ca, 0.02% Al, 0.23% Si, 0.33% Fe, 1.85% S and had a bulk density of only 55 pounds per cubic foot. As can be seen, the purity and the bulk density of the novel nickel oxide is far superior to that of the oxide made by conventional techniques.

EXAMPLE III

An ammoniacal ammonium carbonate, crude, pregnant solution was obtained from the direct leaching of finely ground nickel matte analyzing 1.04% copper, 71.2% nickel, 0.35% iron, 0.77% cobalt, 0.04% selenium and 26.6% sulfur. The solution, analyzing 60 grams per liter of ammonia, 40 grams per liter of carbon dioxide, 12 grams per liter of nickel and 0.18, 0.13, 0.01, 4.6 and 0.002 grams per liter of copper, cobalt, iron, sulfur and selenium, respectively, was heated at 160° F. for three hours to hydrolyze trithionate sulfur contained therein. The solution before and after hydrolysis showed the following sulfur distribution:

|  | G.p.l. Sulfur Present as— | | |
|---|---|---|---|
|  | $S_2O_3=$ | $S_3O_6=$ | $SO_4=$ |
| Before | 0.1 | 1.7 | 2.8 |
| After | 1.2 | 0.1 | 3.3 |

Sodium hydrosulfide was then added to the solution in an amount equal to 5% by weight of the nickel in solution. A copper-, selenium-, and cobalt-containing precipitate formed, analyzing 12.0% Cu, 24.7% Ni, 0.12% Se, and 1.53% Co (representing 99.9% of the copper, 3% of the nickel, 27% of the selenium and 17% of the cobalt). This precipitate was filtered off. The partly-purified pregnant solution was then heated at 212° F. to vaporize ammonia and carbon dioxide, and to completely precipitate the nickel as an impure basic nickel carbonate. The carbonate was filtered off and the barren solution was discarded. A part of the carbonate, which analyzed 12.6% $CO_2$, was calcined in air at 850° F. The oxide analyzed: 74.7% Ni, 0.001% Cu, 0.0024% Fe, 0.704% Co, 0.03% Se and 0.195% S.

Another part of the impure basic nickel carbonate was dissolved in ammoniacal ammonium carbonate solution containing 100 grams per liter of ammonia and 50 grams per liter of carbon dioxide and 5 grams of sodium hydrosulfide per 100 grams of nickel being dissolved. In this opperation, a residue containing substantially all the residual copper, iron, selenium and sulfur as well as a part of the cobalt and 5% of the nickel remained undissolved. This residue, analyzing 0.01% Cu, 37% Ni, 0.01% Fe, 3.3% Co and 0.30% Se was filtered off, while the purified nickel-containing ammoniacal ammonium carbonate solution, analyzing 40 grams per liter of nickel was heated at 210° F. to precipitate 95% of the nickel as a basic nickel carbonate analyzing 18.2% $CO_2$. This carbonate was filtered off and washed with a solution containing 10 grams per liter of ammonia and 25 grams per liter of carbon dioxide to remove sulfur therefrom. The purified basic nickel carbonate was then calcined at 850° F. to an acid soluble, dense, black nickel oxide, analyzing 75.9% Ni, less than 0.001% Cu, 0.001% Fe, 0.37% Co, less than 0.001% Se and 0.005% S and having a packed bulk density of 120 pounds per cubic foot.

By comparing the purity of this nickel oxide with that of the nickel oxide produced in a single stage treatment, it can be seen that the novel product is far superior to the conventional product of prior art.

The special active black nickel oxide provided in accordance with the invention has been subjected to intensive chemical and physical examination. It was found that the lines of a X-ray diffraction film pattern of the oxide were broadened. Careful chemical analysis of a material has established the presence of oxygen therein in amounts exceeding by a small percentage the amount corresponding to the stoichiometric formula NiO. The hydrogen reduction method employed as indicated in Table I was as follows:

Two 10-gram samples of nickel oxide were weighed out and placed in quartz boats. Each boat was placed inside a Vycor tube which was inserted into a tube furnace. Dry, oxygen-free nitrogen gas was passed over the first sample at the rate of about 200 ml. per minute while the temperature of the sample was raised to 1000° F. The moisture which was given off was collected in a tarred absorbing vessel previously flushed with nitrogen and containing activated alumina. When most of the moisture appeared to have been driven off, the absorber was quickly replaced by a second absorber, previously flushed with nitrogen and tarred. The increase in weight of the first absorber was determined. The process of changing and weighing absorbers was continued until the absorbers showed no further increase in weight. This normally took about two hours. The total amount of water collected represented the moisture content of the sample.

The second 10-g. sample in the second furnace was subjected to a flow or dry hydrogen at about 250 ml. per minute, while the temperature of the sample was raised to 1000° F. The water which was produced during the reduction was collected in a tarred absorbing vessel, previously flushed with hydrogen and containing activated alumina. When the reduction appeared to be complete, the absorber was quickly replaced by a second tarred absorber and the increase in weight of the first absorber was determined. The process of changing and weighing the absorber was continued until the absorbers showed no further increase in weight. Normally, reduction was complete in two hours.

The nickel metal obtained by the hydrogen reduction of the second sample was dissolved in sulfuric acid and the total amount of nickel was determined. The oxygen to nickel ratio in the original sample was calculated from the difference in weight of the total weights of water collected from the first and second sample of nickel oxide and from the total weight of nickel present in the materials after reduction.

It is believed that the unusual chemical activity found for the new nickel oxide is related to its content of excess oxygen. It seems possible that the new material may contain some trivalent nickel, whereby vacancies may be created in the lattice.

It is to be observed that the present invention provides a novel process for producing a new, high purity nickel oxide on a large production-scale basis which is sufficiently pure to meet the rigid specifications of the chemical and electronic industries and yet which is produced economically enough to be utilized in the metallurgical and ceramic industries. At the same time, this novel nickel oxide product is much denser than that prepared by prior art techniques, thus facilitating shipping and handling of the oxide. In carrying out the present invention on a commercial scale, the novel nickel oxide product has been regularly produced with a bulk density of about 200 pounds per cubic foot. The ready acid solubility and high purity of the new nickel oxide product containing a small excess amount of oxygen as compared to the stoichiometric relationship NiO makes the material especially suitable for the manufacture of nickel salts such as nickel sulfamate, etc., used in nickel plating baths, as a makeup material to supply nickel ions to depleted nickel plating baths, etc. Basic nickel carbonates as contemplated in accordance with the present invention comprise a series of hydrated compounds containing nickel carbonate and nickel hydroxide in which the carbonate to hydroxide ratio may be varied over a wide range.

Those skilled in the art will appreciate that when ammoniacal solutions containing sulfur are heated, e.g., by steam distillation, as contemplated in accordance with the present invention to volatilize and recover the ammonia content thereof, it is necessary first to add to the solution an alkali metal base in an amount equivalent on a weight basis to the sulfur content. In this manner, formation of ammonium sulfate is avoided and upon heating of the solution, the ammonia content of the solution can be completely volatilized for recovery. Because of the cost considerations, sodium carbonate (soda ash) is the most acceptable base for this purpose. This procedure was followed in the examples described herein.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As a new article of manufacture, an active black nickel oxide having an oxygen content at least about 1 atomic percent and up to about 5 atomic percent oxygen in excess of the amount required to satisfy the stoichiometric ratio expressed by the formula NiO and being characterized by a packed bulk density of at least 90 to about 200 pounds per cubic foot, by an impurities content less than 0.5%, by a particle size such that the product will pass a 325 mesh screen almost entirely but about 70% of the particles are greater than 10 microns and by substantially 100% solubility in mineral acids.

2. The process for preparaing a readily filterable nickel carbonate precipitate from an ammoniacal nickel carbonate solution containing at least about 10 and up to about 60 grams per liter of nickel which comprises heating said solution in the temperature range of about 170° F. to about 250° F. to drive off ammonia and carbon dioxide contained therein and precipitating nickel therefrom at a controlled precipitation rate of about 0.2 to about 2 grams of nickel per liter per minute to precipitate at least about 70% up to about 99% of the nickel content of said solution as a readily filterable nickel carbonate containing at least about 7% carbon dioxide.

3. The process for purifying crude nickel carbonate contaminated with at least one contaminant which forms an insoluble sulfide which comprises dissolving said crude nickel carbonate at a redox potential between about minus 450 and minus 475 millivolts in an ammoniacal ammonium carbonate solution containing a controlled amount of a soluble sulfide to obtain a nickel solution containing at least about 10 grams of nickel per liter and to produce an undissolved sulfide residue containing only a minor amount of nickel, separating said sulfide residue from said nickel-containing solution, and heating said nickel-containing solution at a temperature of about 170° F. to about 250° F. to drive off ammonia and carbon dioxide contained therein and to recover a purified nickel carbonate precipitate.

4. The process according to claim 3 wherein the dissolving solution contains about 50 to 150 grams per liter of ammonia and about 25 to about 75 grams per liter of carbon dioxide and contains a soluble sulfide in an amount not exceeding about 3% by weight of the nickel contained in the crude nickel carbonate.

5. The process according to claim 3 wherein the crude nickel carbonate contains copper but the ratio of nickel to copper therein is at least about 500 to 1.

6. The process for purifying a crude nickel-containing ammoniacal ammonium carbonate solution contaminated with at least one contaminant from the group consisting of copper, cobalt and selenium which comprises treating said solution with a controlled amount of a soluble sulfide precipitant to produce a sulfide precipitate containing not more than 10% of the nickel and most of the contaminants as a sulfide precipitate, separating the sulfide precipitate from the solution, heating the resulting solution to drive off ammonia and carbon dioxide and to precipitate substantially all the nickel as a crude nickel carbonate, separating said crude nickel carbonate from the supernatant barren solution, dissolving said crude nickel carbonate in an ammoniacal ammonium carbonate solution containing a controlled amount of a soluble sulfide to obtain a purified solution containing at least about 10 grams per liter of nickel and to produce an undissolved sulfide residue containing impurities but only a minor amount of nickel, separating said sulfide residue from said purified nickel-containing solution and heating said nickel-containing solution at a temperature of about 170° F. to about 250° F. to drive off ammonia and carbon dioxide contained therein and to precipitate at least about 70% but not more than about 99% of the nickel as a readily filterable, purified basic nickel carbonate at a controlled precipitation rate of about 0.2 to 2 grams of nickel per liter per minute.

7. The process according to claim 6 wherein the initial impure nickel-containing solution is an ammoniacal ammonium carbonate leach solution.

8. The process according to claim 6 wherein the impurity sulfide precipitation is controlled at a redox potential in the range of minus 250 to minus 360 millivolts.

9. The process according to claim 6 wherein the solution of crude nickel carbonate in the presence of soluble sulfide is controlled at a redox potential of minus 450 to minus 475 millivolts.

10. The process according to claim 6 wherein the solution employed to dissolve the nickel carbonate precipitate contains about 50 to about 150 grams per liter of ammonia and about 25 to about 75 grams per liter of carbon dioxide.

11. The process according to claim 6 wherein the purified nickel carbonate contains at least about 7% carbon dioxide.

12. A process as described in claim 6 in which the crude nickel-containing ammoniacal ammonium carbonate solution contains trithionate sulfur and is heated for about one hour at between 140° F. and 170° F. to hydrolyze trithionate sulfur contained therein before addition of the water-soluble sulfide compound.

13. A process as described in claim 6 in which at least one water-soluble sulfide compound from the group consisting of sodium hydrosulfide, sodium sulfide and hydrogen sulfide is added to the crude nickel-containing solution in amounts controlled to precipitate substantially all the copper, in the order of half of the selenium, in the order of one-third of the cobalt and less than 10% of the nickel contained in said solution as sulfides.

14. A process as described in claim 6 in which the impure basic nickel carbonate precipitate is dissolved in an ammoniacal ammonium carbonate solution in the presence of amounts of at least one water-soluble sulfide compound from the group consisting of sodium hydrosulfide, sodium sulfide and hydrogen sulfide controlled to prevent dissolution of at least the greater part of the cobalt and substantially all of the selenium and the copper in said initial carbonate precipitate.

15. A process as described in claim 6 in which the purified basic nickel carbonate is washed with a solution containing from 10 to 20 grams per liter of ammonia and from 25 to 50 grams per liter of carbon dioxide to remove sulfur therefrom.

16. A process as described in claim 6 in which the purified nickel-containing ammonium carbonate solution is heated at between about 200° F. and about 250° F. to remove ammonia and carbon dioxide therefrom and to precipitate at a controlled precipitation rate of about 0.2 to about 2 grams of nickel per liter per minute, between about 70% and 99% of the nickel contained therein in the form of a readily filterable, purified basic nickel carbonate containing over 7% carbon dioxide, while leaving not less than 1 gram per liter of nickel in solution.

17. A process as described in claim 16 wherein about 85% to 95% of the nickel is precipitated.

18. A process as described in claim 16, wherein the nickel is precipitated at the rate of about 0.5 to 1 gram of nickel per liter per minute.

19. A process as described in claim 6 in which the purified basic nickel carbonate is calcined in the presence of excess oxygen at between about 500° F. and 1600° F. to form an acid-soluble, dense nickel oxide with an impurities content of less than 0.5% and a bulk density of over 75 pounds per cubic foot.

20. A process as described in claim 19 wherein the temperature of calcination is about 600° F. to 1200° F.

21. A process for treating nickel-containing ammoniacal ammonium carbonate leach solutions for recovery of nickel oxide of high purity which comprises heating said solution at between 140° F. and 170° F. to hydrolyze trithionate sulfur contained therein; adding a water-soluble sulfide compound to said leach solution in an amount controlled to precipitate substantially all the copper, in the order of half of the selenium, in the order of one-third of the cobalt and less than 10% of the nickel contained in said solution as sulfides; heating the resulting sulfide-treated leach solution to remove ammonia and carbon dioxide therefrom, to form an initial, impure, basic nickel carbonate precipitate and to leave a substantially nickel-free solution; dissolving the resulting initial, impure, basic nickel carbonate precipitate in an ammoniacal ammonium carbonate solution containing a water-soluble sulfide compound, present in an amount controlled to prevent dissolution of at least the greater part of the cobalt, substantially all the selenium in said initial carbonate precipitate, to form a purified nickel-containing ammonium carbonate solution containing about 20 to about 60 grams per liter of nickel and a solid, impurities-containing sulfide residue; heating the resulting purified nickel-containing ammonium carbonate solution at between about 200° F. and about 250° F. to remove ammonia and carbon dioxide therefrom and to precipitate at a controlled rate of about 0.2 to about 2 grams of nickel per liter per minute, between about 70% and 99% of the nickel contained therein in the form of a readily filterable secondary basic nickel carbonate containing over 7% carbon dioxide while leaving not less than 1 gram per liter of nickel in solution; washing said secondary basic nickel carbonate with a wash solution containing from 10 to 20 grams per liter of ammonia and from 25 to 50 grams per liter of carbon dioxide to remove sulfur therefrom and leave a pure basic nickel carbonate; and calcining said pure basic nickel carbonate in air at between about 600° F. to 1200° F. to form an acid soluble, dense nickel oxide with an impurities level low enough to permit utilization in the chemical and electronic industries.

22. A process as described in claim 21 in which the nickel-depleted ammonium carbonate solution and the ammonium carbonate wash solution is heated to precipitate and recover the nickel contained therein and to recover ammonia and carbon dioxide for re-use.

23. A process as described in claim 21 in which the pure basic nickel carbonate is calcined to form nickel oxide with an impurities content of less than 0.5% and a bulk density of between 75 and 200 pounds per cubic foot.

References Cited

UNITED STATES PATENTS

| | | | |
|---|---|---|---|
| 2,408,311 | 9/1946 | Hills et al. | 23—61 |
| 2,531,336 | 11/1950 | Hills et al. | 23—61 |
| 2,608,466 | 8/1952 | Fox | 23—61 X |
| 2,693,404 | 11/1954 | Mackiw | 23—135 X |
| 2,693,405 | 11/1954 | Mackiw et al. | 23—135 |
| 2,913,334 | 11/1959 | Dean | 75—119 X |
| 2,989,373 | 6/1961 | Llewelyn et al. | 23—183 |

OTHER REFERENCES

Kolthoff et al.—"Treatise on Analytical Chemistry"—Part II, vol. 2, Interscience Publishers, N.Y., 1962, p. 386.

Mellor—"Comprehensive Treatise on Inorganic & Theoretical Chemistry"—vol. 15, Longmans, Green and Co., New York, pp. 379 and 380.

Craig—Abstract of S.N. 741,235.—Pub. Aug. 21, 1951, O.G. 649, O.G. 690.

OSCAR R. VERTIZ, Primary Examiner.

MILTON WEISSMAN, Examiner.

G. T. OZAKI, Assistant Examiner.